United States Patent [19]

Baldwin et al.

[11] 4,204,175
[45] May 20, 1980

[54] SLAB LASER ASSEMBLY

[75] Inventors: Gary D. Baldwin, Columbia; Robert W. Rampolla, Ellicott City, both of Md.

[73] Assignee: Westinghouse Electric Corp., Pittsburgh, Pa.

[21] Appl. No.: 870,899

[22] Filed: Jan. 19, 1978

[51] Int. Cl.² ............................................. H01S 3/06
[52] U.S. Cl. ........................... 331/94.5 D; 331/94.5 C
[58] Field of Search ....................... 331/94.5 C, 94.5 D

[56] References Cited

U.S. PATENT DOCUMENTS

| | | | |
|---|---|---|---|
| 3,179,899 | 4/1965 | Fox | 331/94.5 C |
| 3,387,204 | 6/1968 | Ashkin et al. | 331/94.5 N |
| 3,398,379 | 8/1968 | Sims et al. | 331/94.5 Q |
| 3,405,992 | 10/1968 | Hutson et al. | 350/147 |
| 3,444,478 | 5/1969 | Gudmundsen et al. | 331/94.5 C |
| 3,517,327 | 6/1970 | Treuthart | 331/94.5 C |
| 3,564,450 | 2/1971 | Immarco et al. | 331/94.5 Q |
| 3,574,438 | 4/1971 | Carson | 50/286 |
| 3,597,701 | 8/1971 | Cornillault | 331/94.5 Q |
| 3,628,180 | 12/1971 | Segre | 331/94.5 C |
| 3,855,547 | 12/1974 | Kirk | 331/94.5 C |
| 3,982,203 | 9/1976 | de Wit | 331/94.5 C |
| 4,011,524 | 3/1977 | Firester | 331/94.5 C |

*Primary Examiner*—William L. Sikes
*Attorney, Agent, or Firm*—H. W. Patterson

[57] ABSTRACT

The beampath of input radiation in alignment with the longitudinal axis of symmetry of a rectangular parallelepiped laser slab is divided and criss-crossed by a Brewster angle input prism member into two criss-crossing beam path portions fed into the slab input end face for criss-crossing multiple-reflection propagation along the slab to its output end face to be reunited into the single longitudinal-axis-aligned beam by a Brewster angle output prism member adjacent to such output face.

6 Claims, 4 Drawing Figures

SLAB LASER ASSEMBLY

BACKGROUND OF THE INVENTION

1. Field of the Invention

Laser devices in which the active laser member is in the form of a slab. 2. Description of the Prior Art Increased demands are being placed on laser sources, both as to military and industrial applications. Use of the slab configuration for the active laser member in place of the cylindrical rod configuration, offers potential for increasing the average output power limit of such member, for any given material of which such member is composed. Furthermore, the ability to vary the average power output over wide ranges without noticeably affecting beam divergence or efficiency is an intrinsic and valuable property of slab lasers.

While a slab laser is simple in concept, its use can be complicated by practical considerations. FIGS. 1a and 1b illustrate the pertinent geometical features of a prior art laser slab of rectangular cross section. Laser radiation can enter and exit via end faces A and propagate along path P down the length of the slab by successive total internal reflections from optically polished top and bottom faces B. In operation, coolant (not shown) is passed over such faces B while side faces C are thermally insulated. Pump radiation enters the slab via the faces B. Faces A must remain unobstructed; hence, a seal D is utilized to contain the coolant flow.

Efficiency of the slab laser depends primarily on the total internal volume of the active laser medium which is swept out by the laser beam as it propagates down the length of the slab. This swept volume, in turn, is influenced by the coupling technique used to introduce and extract laser radiation from the slab and the width of the coolant seal necessary for reliable operation. In general, it has been the practice to taper the ends of the slab for Brewster angle coupling as in FIG. 1a. This gives an input and output beam path that is parallel to the longitudinal axis of symmetry of the slab and permits an in-line resonator design. It also affords flexibility in selection of the optical pump configuration, and it permits linearly polarized laser output even at high average power. Such FIG. 1a coupling configuration, however, tends to: (1) limit the volume of the slab swept by the beam, often to less than fifty percent of the total slab volume, due to seal width requirements; (2) complicate construction due to the fragility and configuration of the Brewster angle ends of a laser slab of material such as Nd:YAG (3) introduce thermal imbalances in the Brewster angle ends which can degrade laser performance due to optical distortion; and, (4) introduce asymmetry in pump enclosure geometry, due to off-set of the Brewster angle ends, with consequent reduction in pumping efficiency and added complexity of enclosure design.

SUMMARY OF THE INVENTION

The present invention preserves the advantages of the tapered-end slab of FIG. 1a without the aforementioned undesirable tendencies by utilizing a slab laser of rectangular parallelepiped configuration, coupling the input radiation beam arriving along the longitudinal axis of symmetry of the slab into the input end of the slab by an input Brewster angle prism member that transforms such beam into two criss-crossing beam paths, and coupling the two criss-crossing beam paths arriving at the output end of the slab to a single beam leaving along such axis by an output Brewster angle prism member that performs the necessary reverse transformation. This simplifies the sealing problem, eliminates the fragile and hard-to-form Brewster-angle ends on the slab, eliminates the thermal "end effects" to which such ends are prone, simplies construction and configuration of the pump enclosure for the slab, etc.

DETAILED DESCRIPTION

Figure 1A:
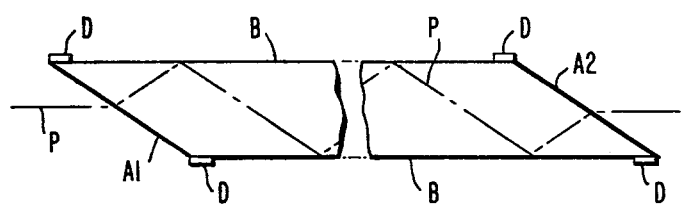
FIGS. 1a and 1b are side and end elevation views of a prior art slab laser having integrally-formed tapered Brewster-angle ends.
Figure 1B:
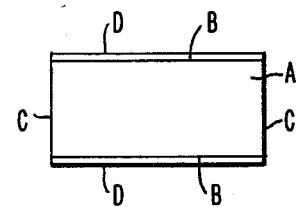
Figure 2:
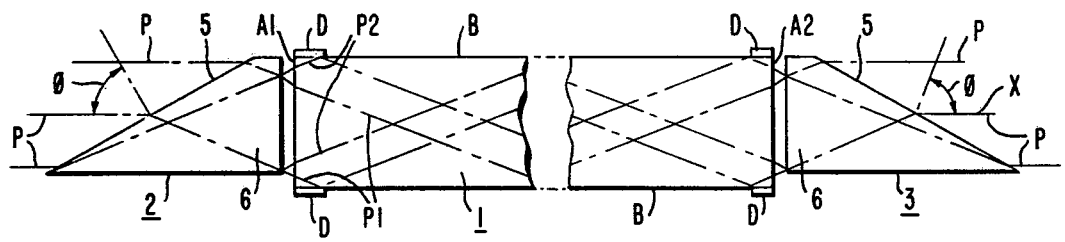
FIGS. 2 and 3 are side elevation views of two slab laser assemblies embodying the present invention.
Figure 3:
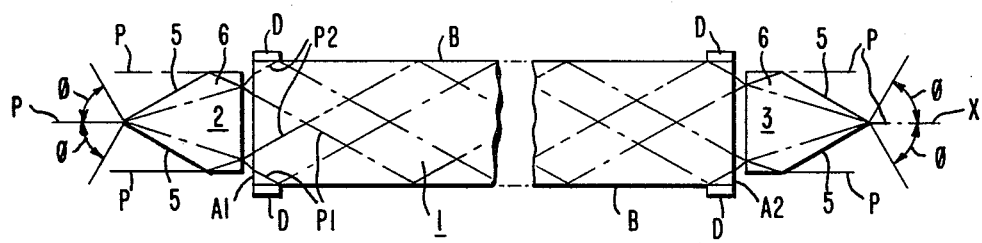

Referring to FIGS. 2 and 3, the present invention comprises a rectangular parallelepiped slab laser 1 of active laser material having flat rectangular end faces A at right angles to the longitudinal axis of symmetry of the slab for entry and exit of laser radiation, upper and lower optically polished flat rectangular faces B for accepting the usual pumping radiation from a source (not shown) and thermally insulated side faces (not shown). In operation, coolant (not shown) is passed over faces B, and seals D extend across the ends of these faces for cooperation with a housing (not shown) to contain the coolant flow. The laser slab 1 may be made of Nd:YAG, for example. This material operates with radiation at a wavelength of 1.06 microns, as may be suitable, for example, for certain military uses, such as target designation, for example. It will be appreciated that insofar as the present invention is concerned, however, other laser materials may be suitable or preferred according to use or need.

In accordance with the present invention, input radiation to the laser slab 1 arriving along a beam path P aligned with the longitudinal axis of symmetry X of such slab is divided by an input Brewster-angle prism member 2 into two criss-crossing beam paths $P_1$ and $P_2$ fed to the input face $A_1$, of such slab and propagated in criss-cross fashion along the slab by multiple internal reflections from upper and lower slab surfaces B to the output slab face $A_2$ where an output Brewster-angle prism member 3 receives the two criss-crossing beam paths $P_1$ and $P_2$ and recombines them into the single, straight, axis-aligned, longitudinal beam path P. In terms of swept-to-physical volume of the slab 1, the coupling prism members 2 and 3 of the present invention permit utilization of approximately ninety percent of the total static volume of laser slab 1.

In the FIG. 2 embodiment, the major portions of the coupling prism members 2 and 3 are of a wedge-shaped TIR type prism configuration and in the FIG. 3 embodiment these portions are of the knife prism configuration. The Brewster angle $\phi$ for the input and output faces 5 for the prism portions of members 2 and 3 are arrived at in well known manner, taking into account the wavelength of the laser radiation and the index of refraction of the material of which the prism members are made; such material being chosen primarily according to the level of laser energy being transmitted.

It will be noted that each prism member 2 and 3, has an integrally-formed straight rectangular parallelepiped coupling end portion 6 for disposition adjacent to the end faces $A_1$ and $A_2$ of the laser slab 1. These coupling end portions 6 serve as transformation regions wherein the two beam paths $P_1$ and $P_2$ assume their criss-cross relationship for introduction to the input face $A_1$ of the slab 1 and extraction from its output face $A_2$.

The knife prism configuration of FIG. 3 was tested with a Nd:YAG laser slab four inches long by two tenths of an inch high and one-half inch wide at its upper and lower polished pumping faces B. End faces A were anti-reflection coated as were the complementary adjacent coupling faces of the knife prism members 2 and 3, which were separated by five thousandths of an inch clearanceway. The prism members 2 and 3 were made of laser grade fused quartz, their apex angles were sixty-nine degrees and twelve minutes, their height was one quarter of an inch, their width was seven-tenths of an inch, and their length was two hundred twenty-five thousandths of an inch. The laser radiation energy was at a wavelength of 1.064 microns, and the Brewster angles $\phi$ were fifty-five degrees and twenty-four minutes.

We claim as our invention:

1. A laser assembly comprising, a rectangular parallelepiped laser slab having a pair of optically polished longitudinal internal reflection faces extending between flat right-angled opposite ends through the centers of which a longitudinal axis of symmetry of said slab passes, said slab having input and output radiation beam paths aligned with said longitudinal axis of symmetry exteriorly of said slab at its opposite ends, respectively, and Brewster angle coupling prism members disposed adjacent to said opposite ends, respectively, one of said members being operative to transform said input radiation beam path into divided criss-crossing beam paths in presentation to one of said opposite ends and another said member being operative to reunite and transform internally-reflected criss-crossing beam paths arriving at the other of said opposite ends into said output radiation beam.

2. The laser assembly of claim 1, wherein at least one of the said coupling prism members are of the total internal reflection type having a single Brewster angle input face.

3. The laser assembly of claim 1, wherein at least one of said coupling prism members are of the knife prism type having a pair of Brewster angle input faces.

4. The laser assembly of claim 1, wherein said laser slab is composed of Nd:YAG.

5. The laser assembly of claim 1, wherein said coupling prism members are composed of fused quartz.

6. The laser assembly of claim 1, wherein each of said coupling prism members includes an integral transformation region of rectangular parallelepiped configuration.

* * * * *